United States Patent

[11] 3,542,462

[72] Inventor: Wilhelm Bertram, Grafelfing near Munich, Germany
[21] Appl. No.: 766,169
[22] Filed: Oct. 9, 1968
[45] Patented: Nov. 24, 1970
[73] Assignee: Ernst & Wilhelm Bertram, Fabrik Phototechn. Messgerate Muechen-Pasing, Germany
[32] Priority: Oct. 11, 1967
[33] Germany
[31] No. 1,597,123

[54] AUTOMATIC EXPOSURE CONTROL DEVICE FOR PHOTOGRAPHIC CAMERAS
9 Claims, 13 Drawing Figs.

[52] U.S. Cl. ............ 352/141, 95/10, 95/64
[51] Int. Cl. ............ G03b 19/18, G03b 9/02
[50] Field of Search ............ 95/10C, 64D; 352/141

[56] References Cited
UNITED STATES PATENTS

| | | | |
|---|---|---|---|
| 2,995,996 | 8/1961 | Gossen | 95/64(D) |
| 3,045,575 | 7/1962 | Akahane | 95/64(D) |
| 3,116,673 | 11/1964 | Bogopolsky | 95/64(D) |
| 3,150,580 | 9/1964 | Ungnadner et al. | 352/141 |
| 3,357,779 | 12/1967 | Soigussaar | 352/141 |

Primary Examiner—John M. Horan
Assistant Examiner—Joseph F. Peters, Jr.
Attorney—Woodhams, Blanchard and Flynn ABSTRACT: An automatic light exposure control device, particularly for use in a motion picture camera. The device consists of a housing having an electromagnetic interpreting unit in the form of a galvanometer. The galvanometer is provided with a double diaphragm arrangement having two leaves, one of which controls the light passing through a field lens of the camera and the other of which controls the light passing through a precision lens on the housing which is aligned with a photoresistive element connected in the galvanometer circuit. The housing is adapted to be attached to a camera to control the exposure of the film contained therein.

INVENTOR.
WILHELM BERTRAM

INVENTOR.
WILHELM BERTRAM

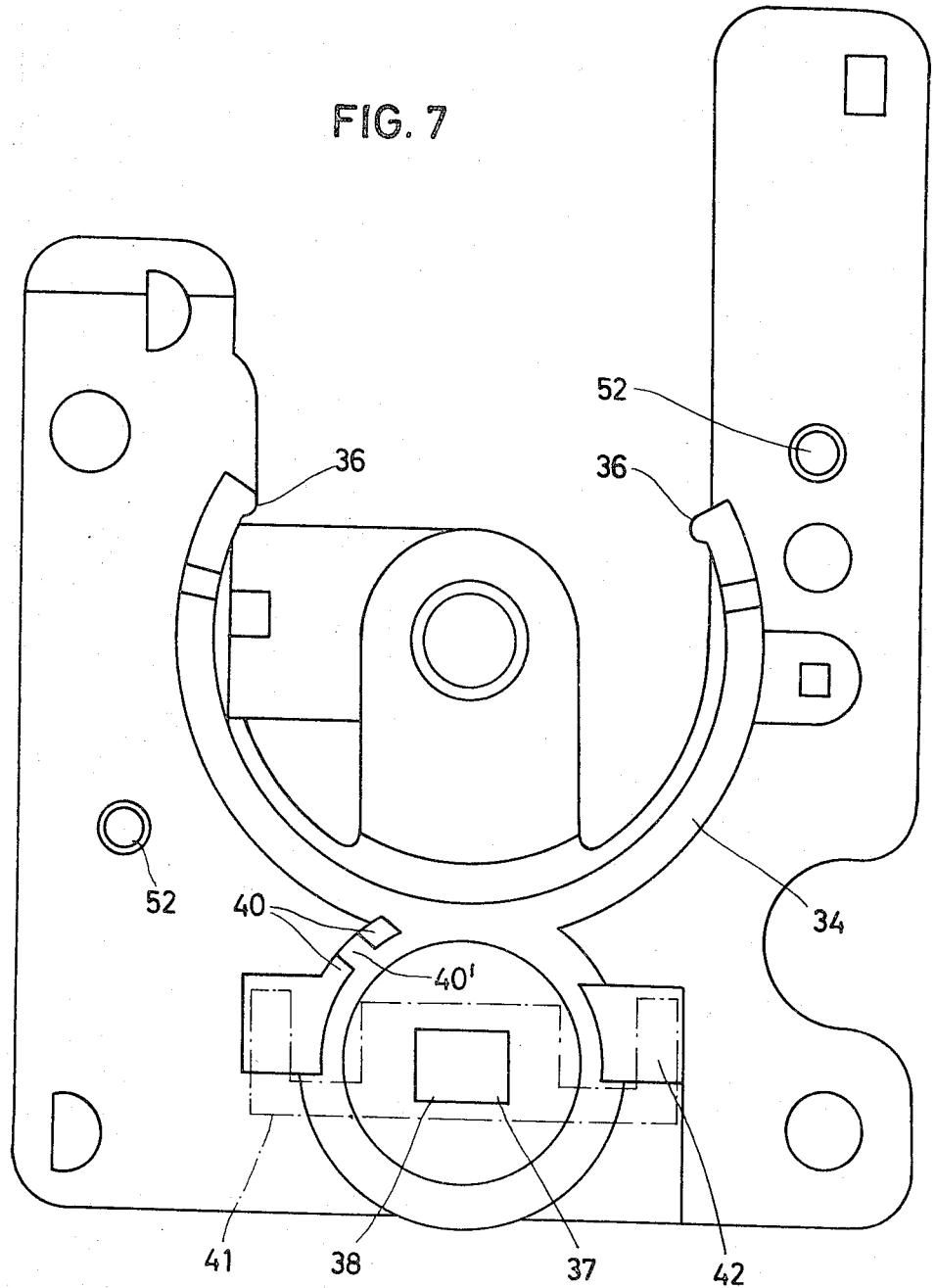

AUTOMATIC EXPOSURE CONTROL DEVICE FOR PHOTOGRAPHIC CAMERAS

This invention relates to an automatic light exposure control device for cameras, in particular motion picture cameras, comprising a light sensitive electronic sensing device which is controllable by light penetrating through a precision lens and a measuring diaphragm and an electromagnetic interpreting unit, which latter is coupled with a rotational double diaphragm leaf. One leaf thereof forms together with a stationary diaphragm mask a field lens diaphragm of the camera and the other leaf forms together with a further stationary diaphragm mask the measuring diaphragm. Said interpreting unit controls the current developed by the electronic sensing device to fix the position of the measuring diaphragm corresponding to the film sensitivity at a given luminosity whereby the interpreting unit variably closes the field lens diaphragm and the measuring diaphragm against a spring force depending on the incident light.

An automatic light exposure control device of the above-discussed type is known in which light is admitted to a light sensitive sensing device, for example a photoresistance, which light does not penetrate into the camera through the field lens but through its own precision lens and a controllable measuring diaphragm arranged in the area of the precision lens. An electric current flowing from the sensing device to the electromagnetic interpreting unit is changed by the light falling on the light sensitive sensing device. The electromagnetic interpreting unit constructed as a rotating coil instrument is rotated through a predetermined amount and thereby moves a double diaphragm leaf the one leaf of which, together with a diaphragm mask fixedly mounted in the region of the measuring precision lens, forms the measuring diaphragm and the other leaf of which, with a diaphragm mask fixedly mounted in the region of the field lens of the camera, forms the photographic field lens diaphragm. Thus, the opening of the field lens diaphragm and also the opening of the measuring diaphragm is automatically controlled by the light falling on the light sensitive sensing device. The electromagnetic interpreting unit, which is energized by the current of the light sensitive sensing device, is thus arranged so that the automatic control of the aperture of the field lens diaphragm corresponds to the film sensitivity at the existing luminosity.

All parts of the known, above-described light exposure control device are separately mounted into the camera. It is therefore necessary in manufacturing the camera to insert all such individual parts one after the other, to individually secure same in position and to then adjust them exactly with respect to one another. Such installation and adjustment operations are very expensive and time consuming and must be carried out with great precision. During the installation of the several parts of the known light exposure control device in the camera, no further operations can take place at the camera. Thus, the manufacture of the camera requires more time which is particularly disadvantageous for the mass production on assembly lines. In the case of servicing or repair, the several parts of presently known light exposure control devices must be taken out of the camera individually and then during installation, after servicing, they must again be precisely adjusted against one another requiring a great amount of work. All these operations can only be performed by skilled men. Thus, the entire automatic light exposure control device as presently known is uneconomical and unpractical in manufacture, in service and in operation and due to the many parts which are to be individually secured and adjusted in the camera, same is also susceptible to trouble.

The basic purpose of the invention is to construct an automatic light exposure control device of the above-described type which has a simple and sturdy structure, which allows an economical mass production, an easy service and repair and which assures an exact, reliable and sensitive automatic diaphragm control in cameras.

To attain this purpose the invention provides that the light exposure control device has a housing in which there are provided two oppositely positioned adjustable bearings for the rotating axes of a rotating coil, further for a core magnet arranged within the rotating coil and a return iron ring enclosing the rotating coil at a radial distance therefrom, and in which housing there is further provided a light opening at the one end of which the precision lens, and at least a part of the measuring diaphragm, are secured and to the other end of which the light sensitive electronic sensing device is mounted, that furthermore the diaphragm masks are secured in mountings at the housing, that furthermore the double diaphragm leaf is pivotable at a small distance over the diaphragm masks, that the rotating coil is mechanically coupled with the measuring diaphragm and also with the field lens diaphragm and that finally the light exposure control device which is combined to a compact unit by the housing can be installed in a camera as a unit and can there be adjusted and secured in position relative to the field lens.

The control device of the invention allows an automatic diaphragm control depending on the existing luminosity without requiring the person operating the camera to manually interfere. Contrary to this, the known light exposure control devices are only indicating devices, the indication of which must be transferred manually by a person operating the camera to a corresponding diaphragm position. Thus the light exposure control device of the invention assures, contrary to the known devices, at any time a correct diaphragm adjustment corresponding to the existing conditions for taking pictures and thus makes it possible for the camera to be ready to be used at any time without time-consuming preparations. Aside from this, all parts of the subject matter of the application are secured in a housing and are thus combined into a compact unit which is arranged as a unit inside a camera housing. Contrary to this, in the known light exposure measuring devices, either only the light exposure meter is arranged in its own housing in the camera and a plurality of intermediate members are arranged outside the light meter housing and in the camera housing, or the device is stored in a housing which can be mounted to a lens of a camera from the outside and thus projects annoyingly to the outside and is easily damaged. A compact, self-contained construction of a camera in which a light exposure control device is stored protected from the outside as a self-contained unit, can only be accomplished with the device of the invention and not with the known light exposure measuring devices.

The light exposure control device of the invention forms a self-contained compact unit which is assembled separately and can then be installed as a unit in a camera. In this manner a very economical manufacture of the light exposure control device is achieved. Furthermore, the light exposure control device of the invention allows a very economical mass production of cameras since the installation of the light exposure control device as a compact unit into the camera can be done in a very short period of time and contrary to the known light exposure control devices not all of the parts must be installed separately in the camera. In the light exposure control device of the invention, the housing which combines all parts to a compact unit takes over several functions. One function of the housing is that it is used as a bearing for the rotating coil. Furthermore it is used as a holder for the core magnet and a return iron ring. Still further, it defines a light opening and mountings for the light sensitive device, for the precision lens and for diaphragm masks of the measuring diaphragm and the field lens diaphragm. Since all of the mentioned parts are arranged in or on the housing, an exact adjustment of all of these parts relative to one another is assured. The double diaphragm leaf is also connected to the housing through the rotating coil. The light exposure control device of the invention therefore has both the complete measuring diaphragm and also the complete field lens diaphragm. Thus, the entire light exposure control device can be inserted into a camera as a unit and can be secured and adjusted therein with a few manipulations. A time-consuming adjustment of the single parts of the light exposure control device inside the camera is no longer required.

The housing of the light exposure control device of the invention can be constructed advantageously in such a manner that said device has projections or recesses which cooperate with recesses or projections in the camera housing and allow a simple insertion and adjusting of the light exposure control device in the camera housing. It is for example possible to provide slotted holes in the housing of the light exposure control device and to screw the light exposure control device into the adjusted position in the camera housing by means of screws guided through the slotted holes. The housing of the light exposure control device can be constructed advantageously of plastic. This assures a very economical and exactly measured manufacture, for example by an injection molding process.

The light exposure control device of the invention can, in the case of repairs, be removed from the camera as a unit with few manipulations. It is then possible to insert, as a replacement, a similar light exposure control device of the invention into the camera so that the camera will be usable during the repair of the first light exposure control unit of the invention. This can be of great importance particularly during motion picture making. All together, the light exposure control device of the invention is simple, compact and sturdy in construction and reliable, practical and economical in operation and assures an exact and sensitive diaphragm control since its individual parts can be adjusted precisely in the housing.

A particularly simple, advantageous construction of the light exposure control device of the invention is given in that the double diaphragm leaf is secured to the axis of the rotating coil and is connected rotationally fixed therewith.

The light exposure control device of the invention is further constructed advantageously in such a manner that at least one color filter is secured in the light opening as seen in direction of the incident light before the electronic device. The color filter or the color filters can be secured in the light exposure control device adjusted relative to the precision lens and the measuring diaphragm and relative to the light sensitive device. It is possible by means of built-in color filters to suitably use the light exposure control device for film adapted to either daylight or artificial light.

Further characteristics and advantages of the invention will result from the following description of one embodiment in connection with the drawings, in which:

FIG. 7 is a view of the housing of FIG. 4 from behind;

FIG. 8 is a partial cross-sectional view of the housing along the line VIII-VIII of FIG. 4;

FIG. 10 is a partial cross-sectional view of the housing along the line X-X of FIG. 4;

Figure 1:
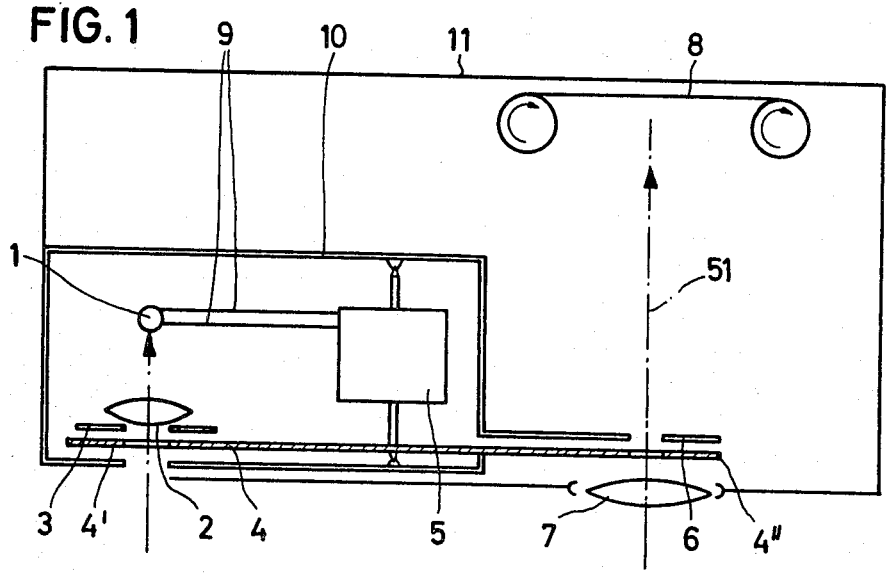
FIG. 1 is a schematical illustration of the diaphragm control device of the invention as installed in a camera.
Figure 2:
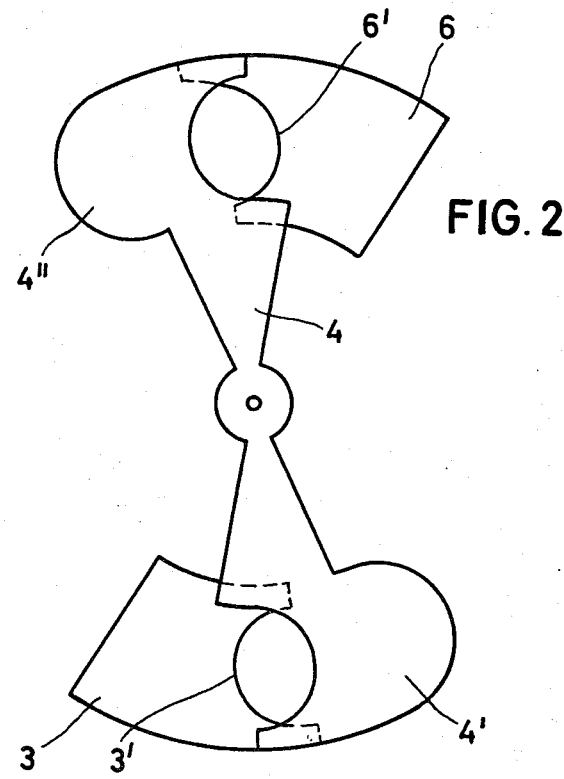
FIG. 2 is a top elevational view of a double diaphragm leaf and diaphragm masks cooperating therewith of the diaphragm control device of FIG. 1.
Figure 3:
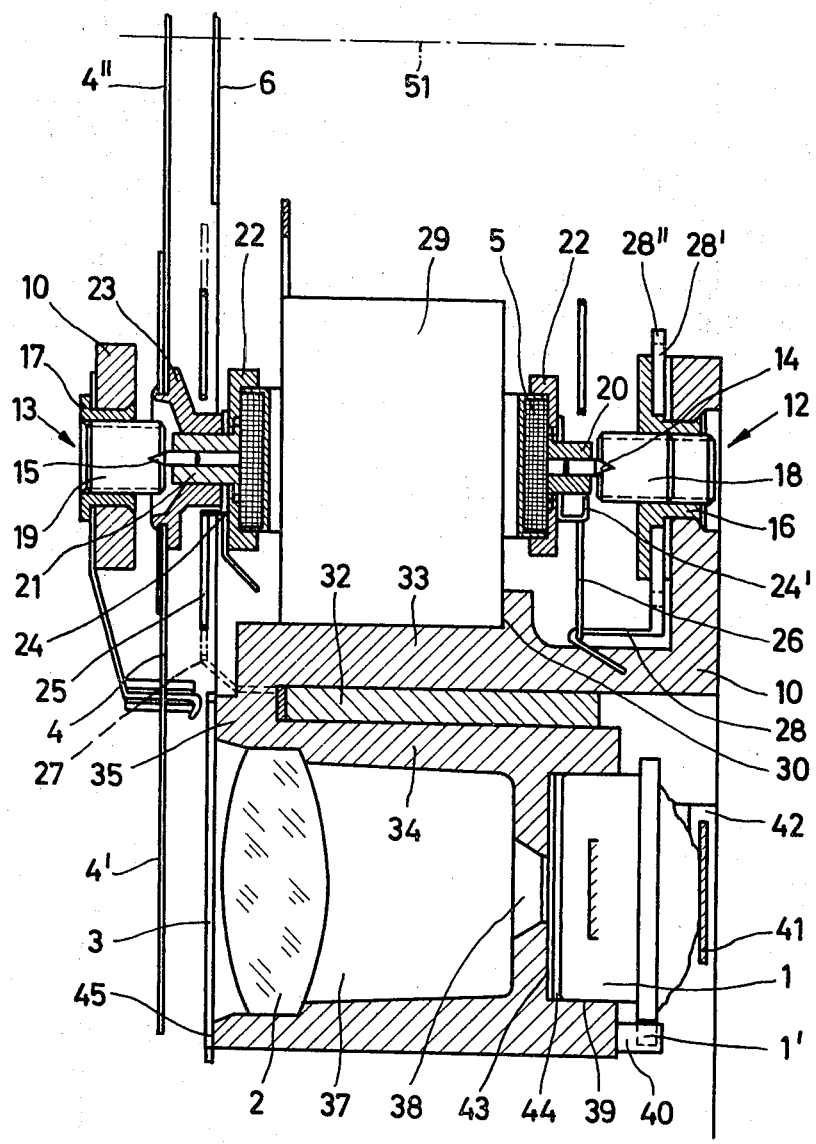
FIG. 3 is a longitudinal cross-sectional view of a light exposure control device of the invention.
Figure 5:
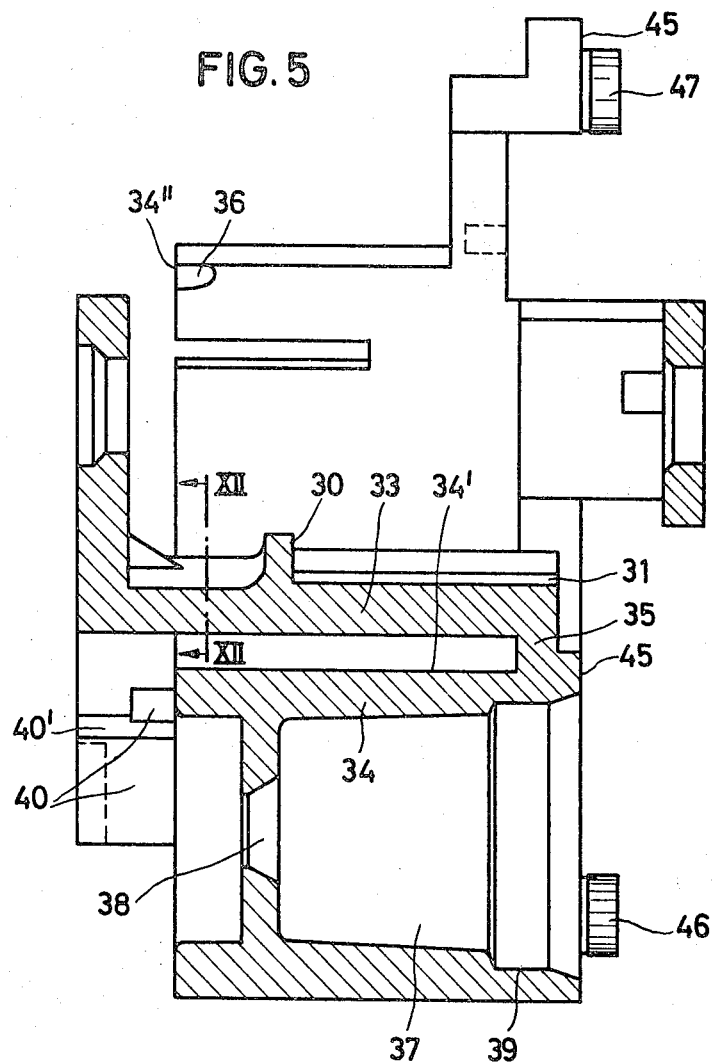
FIG. 5 is a longitudinal cross-sectional view of the housing along the line V-V of FIG. 4 whereby the cross section is guided in the same plane as in the cross-sectional view according to FIG. 3.
Figure 12:
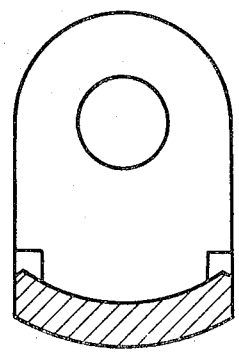
Figure 13:
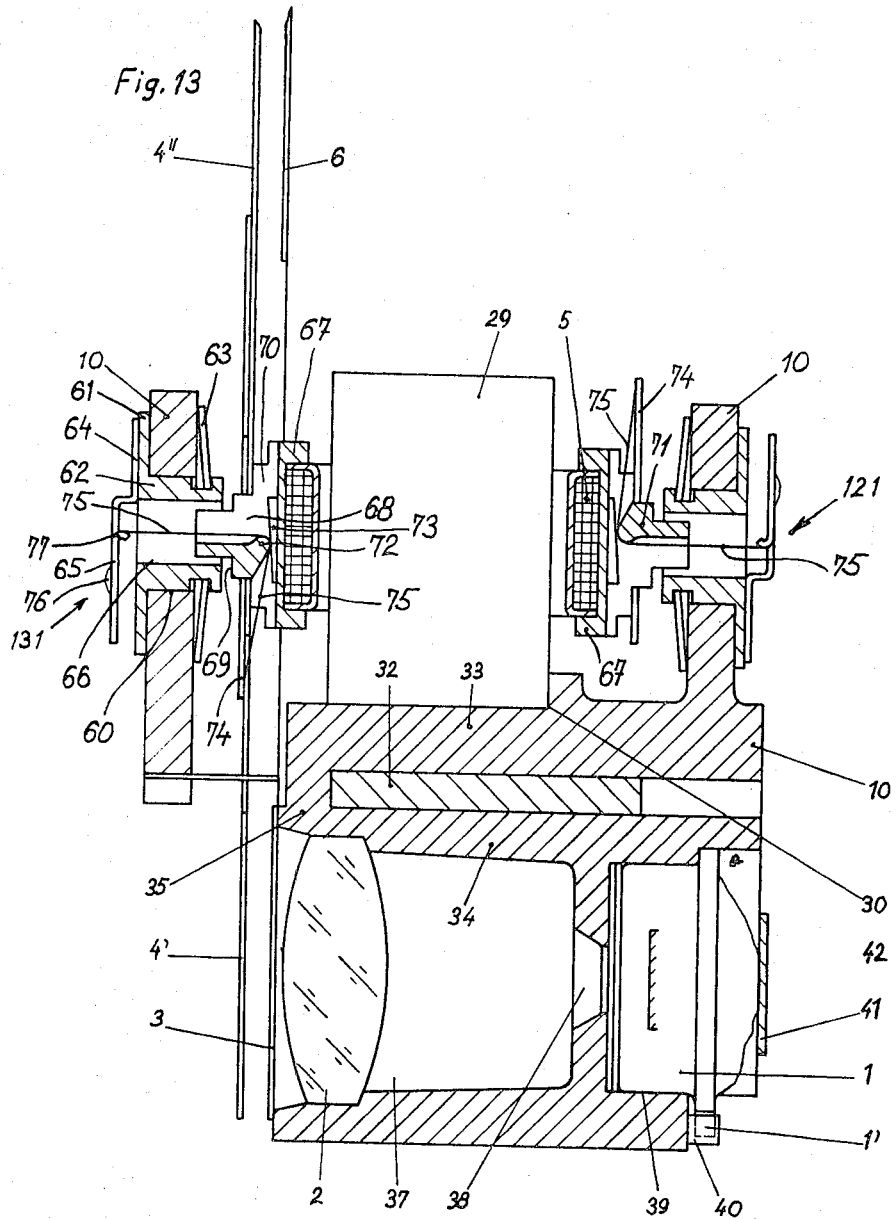

FIG. 12 is a partial cross-sectional view of the housing along the line XII-XII of FIG. 5; and FIG. 13 is a longitudinal cross-sectional view similar to FIG. 3 of a modified embodiment of the light exposure control device, FIG. 1 schematically illustrates an automatic light exposure control device which is already installed in a motion picture camera. The light exposure control device has a light sensitive electrical sensing device 1, said sensing device being a photoresistance in the embodiment discussed here. Said sensing device 1 can be controlled by light which passes through a precision lens 2 and a measuring diaphragm. Said diaphragm comprises a stationary diaphragm mask 3 and a leaf 4' of a double diaphragm leaf 4. The double diaphragm leaf 4 is mounted to an axis of a rotating coil 5. The other leaf 4'' of said double diaphragm leaf 4 forms together with a diaphragm mask 6 an adjustable field lens diaphragm which is positioned in the path of light falling on the film 8 through a field lens 7 of the camera. The sensing device 1 is connected to the rotating coil 5 through electric conductors 9. The parts 1 to 6 and 9 of the automatic light exposure control device are all mounted inside of, or on, a common housing 10. All parts 1 to 6 and 9 are combined to form one single compact unit through the housing 10, said unit being arranged in the housing 11 of the camera and being adjusted therein as to the path of light falling onto the photographic lens 7. Depending on the fluctuations of light falling through the precision lens 2, the sensing device 1 changes its resistance and thus controls the current flowing to the rotating coil 5. Said rotating coil 5 cooperates with a core magnet 29 (FIG. 3) which is also arranged in the housing 10 (however, for a better understanding is not illustrated in FIG. 1) and changes its position upon a current change. During each position change of the rotating coil the double diaphragm leaf 4 is also moved. This causes adjustment of the diaphragm apertures of the field lens diaphragm (6, 4'') and of the measuring diaphragm 3, 4' in response to changes in incident light. FIG. 2 illustrates a top view of the double diaphragm leaf 4 and of the diaphragm masks 3 and 6 cooperating therewith in order to clearly show the operation and construction of the field lens diaphragm and of the measuring diaphragm. Such double diaphragm leaves and diaphragm masks cooperating therewith are already known. By suitably dimensioning the rotating coil and the core magnet, the double diaphragm leaf, the diaphragm masks and at least one coil spring cooperating with said rotating coil (said coil spring not being illustrated in FIG. 1 for reasons of a better understanding, and against which coil spring said rotating coil is rotatable), the light exposure control device of the invention can be adjusted in such a manner that said light exposure control device automatically adjusts the field lens diaphragm in the position corresponding to the film sensitivity at the existing luminosity.

FIG. 3 illustrates a longitudinal cross-sectional view of the light exposure control device. In as far as the parts illustrated therein correspond to the parts schematically illustrated in FIG. 1 and 2, the same reference numerals are used. FIG. 3 illustrates a cross-sectional view of the housing 10 of the light exposure control device of the invention. It can be seen that two oppositely positioned bearings for the axle points 14 and 15 of the rotating coil are provided in said housing, said bearings being generally identified with 12 and 13. The housing 10 is made of plastic, for example, of a glass-fiber reinforced polycarbonate. An injection molding process can, for example, be used for such manufacture. Threaded flange rings 16 and 17 made of metal are riveted into recesses of the housing 10, said flange rings in turn threadedly receiving bolts 18 and 19 therein. One end of each of said bolts has a recess for storing an axle point 14 or 15 of the rotating coil 5 and the other end of which has an opening (not illustrated) for a wrench. The parts 16 and 18 or 17 and 19 form the bearings 12 or 13 for the axle points of the rotating coil 5.

The axle points are fixed against rotation and mounted in sleeves 20 and 21, which sleeves in turn are secured, for example, by gluing or cementing on the rotating coil 5 by means of holding devices 22. A flange ring 23 is secured rotationally fixed, for example glued or cemented, on the sleeve 21, said flange ring 23 being used as a carrier for the double diaphragm leaf 4 and being riveted with same. The double diaphragm leaf has the construction as illustrated in FIG. 2.

Metal bars 24 and 24' are mounted, for example glued, to the holding devices 22 at the rotating coil 5 in the area of both axle points. The inner end of one coil spring 25 or 26 each engages each bar 24 or 24'. The outer ends of the coil springs 25 or 26 are secured to metal arms 27 or 28 which are held in the housing 10, for example are glued into recesses in the housing. The arm 28 is connected in one piece with a disk 28' which is clamped between the flange ring 16 and the housing 10 in such a manner that said disk is rotatable upon application of an outside force for overcoming the static friction. The disk 28' has teeth 28'' at its outer periphery which teeth can be coupled, for example, with a pinion (not illustrated) which is rotatable through a shaft by which it is possible to rotate the disk 28' and thereby stretch springs 26 and 25. Thus, the zero position of the rotating coil 5 can be regulated. The disk 28' can, of course, also be rotated manually for adjustment. The rotating coil 5 is supported in the housing 10 in the described manner and rotatable relative to said housing against the pressure of the springs 25 and 26.

The housing 10 also has a holding device for a core magnet 29 which extends inside the rotating coil 5. The holding device for the core magnet 29 has a contact surface 30 and a recess 31 (FIGS. 4 and 5) in one sidewall, said recess 31 being positively engaged by a corresponding projection of the core magnet. The core magnet 29 is glued or cemented into the housing 10 in its holding device.

Figure 4:
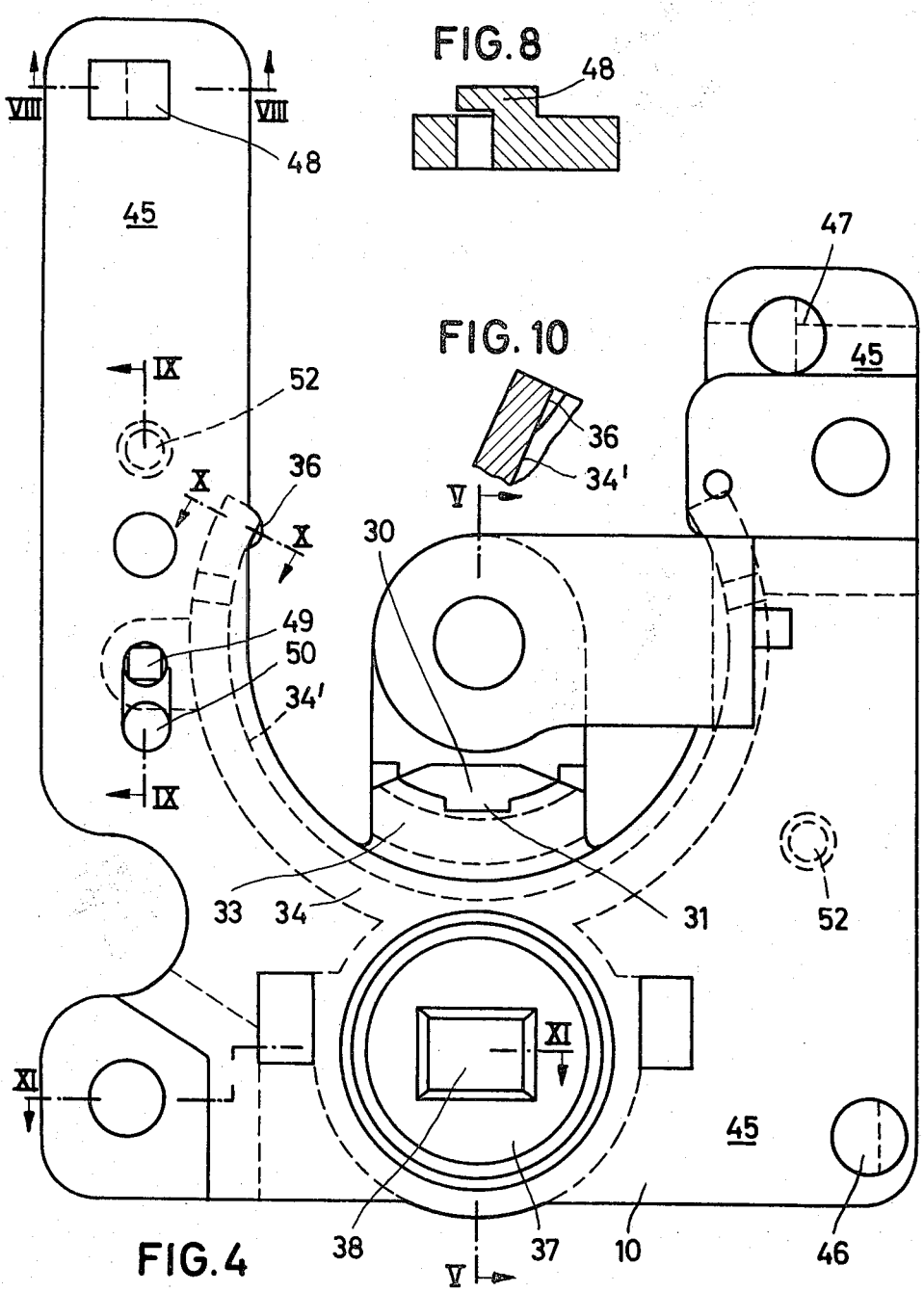
FIG. 4 is a front elevational view of the housing of the light exposure control device according to FIG. 3.

A holder is also provided in the housing for a return iron ring 32 enclosing the rotating coil at a radial distance therefrom. The holder for said ring 32 is formed by two walls 33 and 34 extending concentrically to one another and radially spaced apart in circular arcs (FIGS. 3, 4 and 5). Said walls 33 and 34 are connected at one edge by means of a connecting bridge 35 (FIGS. 3 and 5). The wall 34, on its surface 34' facing the ring 32 at the edge 34'' not facing the connecting bridge 35, has projections 36 for positively holding the ring 32 (FIGS. 4,5, 6, 7, 10). The ring 32 is constructed as an open circular ring and can be moved into its holder in the housing 10 between the walls 33 and 34 coming from the edge 34'' passing by the projections 36. The edges of the wall 34 with the projections 36 move resiliently outwardly during insertion and allow the return iron ring 32 to pass. After the return iron ring has been moved into its holder, the walls 34 resiliently return to their normal position and the projections 36 grip over the one edge of the return iron ring 32 so that same cannot again slide axially out of its holder. The outer casing of the return iron ring, when same is in its position in the holder, abuts the surface 34' of the wall 34.

Figure 11:
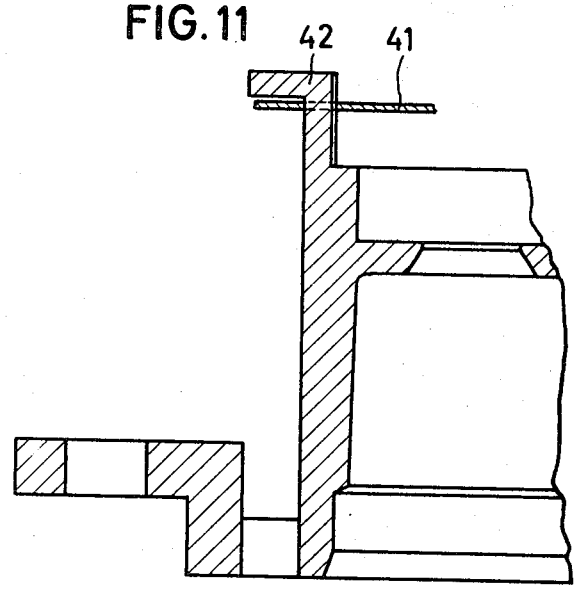
FIG. 11 is a partial cross-sectional view of the housing along the line XI-XI of FIG. 4.

A light opening 37 is provided in the housing 10 (FIGS. 3 to 7). At one end of the light opening 37 there is held and cemented a lens as a precision lens 2 in an annular recess provided therefor. At the other end of the light opening 37 there is provided a window 38 having a rectangular cross section and walls which extend at an inclination corresponding to the angle of the incident light behind which a pot-shaped holder 39 is provided for the electrical sensing device 1. The sensing device 1 has the shape of a circular container which is inserted in the recess 39 and has a radial projection 1' (FIG. 3) which projection engages a selector shaft guide 40' of a holder 40 at the housing 10 so that said sensing device 1 is secured against rotation (FIGS. 3, 5 and 7.). Said sensing device 1 is pressed into the holder recess 39 and is secured against falling out by means of a leaf spring 41 (FIG. 3). The leaf spring 41 has flaps on both ends which project laterally therefrom. The leaf spring 41 is moved with said flaps under hook-shaped extensions on the holder 40 and a projection 42 and is supported against said extensions (FIGS. 3, 7, 11). The leaf spring 41 is illustrated in dash-dotted lines in FIG. 7. In this manner the leaf spring 41 is removably held. If the sensing device 1 is to be removed, the leaf spring 41 can be pulled away laterally from underneath the hook-shaped extensions of the holder 40 and of the projection 42. The sensing device 1 is then freely accessible. The radial extension 1 of the sensing device can be constructed as a sleeve through which electrical conductors are guided which conductors connect the photoresistance of the sensing device with the rotating coil 5.

An A-filter 43 and a gray filter 44 are held in the recess 39 between the window 38 and the device 1. By permanently inserting said filters, the light exposure control device of the invention for the diaphragm control becomes suitable for both the use of daylight film and also the use of artificial light film.

Figure 6:
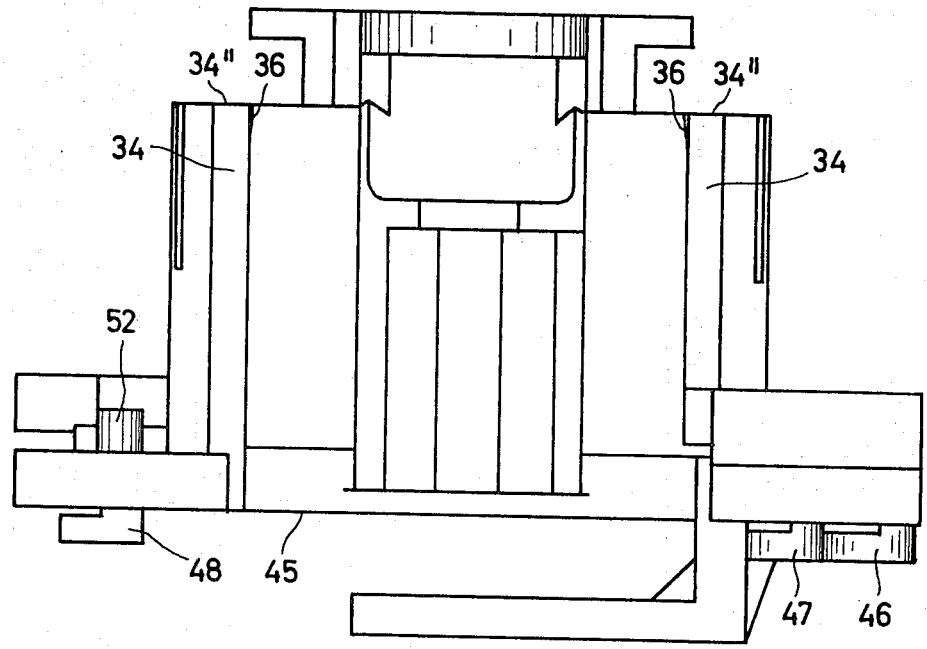
FIG. 6 is a top elevational view of the housing according to FIG. 4.
Figure 9:
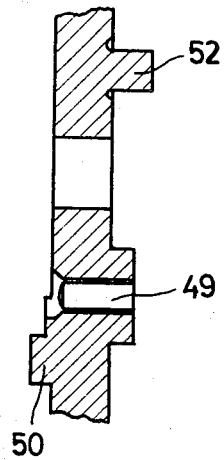
FIG. 9 is a partial cross-sectional view of the housing along the line IX-IX of FIG. 4.

The diaphragm masks 3 and 6 of the measuring diaphragm or the field lens diaphragm are also mounted on the housing 10, said diaphragm masks cooperating with the double diaphragm leaf 4. The housing 10 has an outer surface 45 at which the diaphragm masks 3 and 6 are held in abutting relationship. The outer surface 45 extends in several areas over a large part of the housing and can be seen best in FIGS. 4, 5 and 6. Said outer surface 45 comprises mountings 46, 47 and 48 for the diaphragm masks 3 and 6 (FIGS. 4, 5 and 6). Said mountings 46, 47, 48 are constructed as hook-shaped projections which project over the outer surface 45 of the housing whereby one part of each hook-shaped projection is spaced from and parallel to the outer surface 45 of the housing 10. A cross section of the mounting 48 is illustrated in FIG. 8. Cross sections of mountings 46, 47 would look the same. The mounting 48 is square, when shown in a top view, while the mountings 46 and 47, when shown in a top view, are of a circular structure. The diaphragm masks 3 and 6 are metal disks each of which has an arc-shaped edge 3' or 6' which edge together with a corresponding edge of the respective leaf of the double diaphragm leaf 4 defines a diaphragm aperture (FIG. 2). Furthermore, the diaphragm mask 6 has recesses which in their cross section and in their position are adapted to the mountings 47 and 48. The diaphragm mask 3 has a recess which is adapted to the mounting 46. The diaphragm masks 6 and 3 are placed on the mountings during assembly of the light exposure control device in such a manner that said mountings project through the corresponding recesses in the masks and the masks closely abut the outer surface 45. The masks are then moved laterally sufficiently that the hook-shaped projections grip over the metal of the masks and hold the masks closely to the outer surface 45. For adjustment, the masks can be moved in their mountings parallel to the outer surface 45. A screw can be used to secure the masks in the adjusted position, which screw will be screwed into a square hole 49 provided therefore in the housing 10 (FIGS. 4 and 9). The thread of said screw cuts itself into the walls of said square hole and thus self cuts its thread. The screw may have a clamp head which grips both the diaphragm mask 6 and also the diaphragm mask 3. It is also possible to combine the diaphragm masks 3 and 6 into one single metal disk and to mount said single metal disk to the outer surface 45 of the housing. The projection at the outer surface 45, seen in FIGS. 4 and 9, is used as a guide and extends through a corresponding slotted hole in the metal sheet of the diaphragm mask 3 or, in such metal sheet in case that both diaphragm masks are combined into one metal sheet.

FIG. 3 illustrates a cross section of the diaphragm mask 6 excepting that the part of the housing 10 which holds said diaphragm mask 6 has not been illustrated in order to simplify the drawing. However, the parts of the housing holding the diaphragm mask 6 are clearly illustrated in FIG. 4. FIG. 3 shows the optical axis 51 of the field lens of the camera (compare FIG. 1). The field lens itself and the remaining parts are not illustrated in FIG. 3 to assure a clear understanding of the drawing. However, it can be easily understood by inspecting FIGS. 3 to 12 that the light exposure control device of the invention is a compact unit which can be installed in its entirety in a camera. Fourpins 52 are provided in the housing 10 for securing the light exposure control device in a camera at a place provided therefor. Said pins engage corresponding recesses in a mounting for the light exposure control device in the camera (FIGS. 4, 6, 7 and 9). The light exposure control device can be secured in a camera, for example by means of screws.

In the housing 10 of the light exposure control device of the invention, all parts of the control device can be precisely adjusted relative to one another. The light exposure control device of the invention works very exactly and sensitively and is sturdy and reliable in operation due to its simple construction and due to the possibility of exactly adjusting the several parts to one another.

The invention is not limited to the illustrated embodiment. For example, it is also possible to mount, instead of diaphragm masks and a double diaphragm leaf cooperating therewith two diaphragms of different structure to the housing of the light exposure control device and to mechanically couple said diaphragms with the rotating coil through a suitable mechanism. However, the embodiment illustrated in FIGS. 3 and 13 showing the double diaphragm leaf is particularly characterized by simplicity and safe operation.

It is, for example, also possible to provide the housing with a different construction than above described if the mountings for the described parts are provided only in the housing.

Furthermore FIG. 13 illustrates another storage facility of the rotating coil 5. Like in the example of FIG. 3, here too, a cross-sectional view of the housing 10 of the light exposure control device is illustrated. The bearings, generally identified with 121 and 131 and opposite to one another are here constructed differently than in the example of FIG. 3.

Here, at each bearing, there is inserted a sleeve bearing 62 provided with a flange 61 into a bearing bore 60 arranged in the housing 10. Each sleeve bearing 62 is secured in its position by a resilient slotted guard ring 63. A bent arm 64 is fixed to the flange 61 in such a manner that its free end 65 extends over the bore 66 of the sleeve bearing 62. The end 65 is constructed as a spring. Two oppositely positioned holding pieces 67 are secured on the rotating coil 5. Each holding piece 67 carries a stepped, partially slotted, pivot 68 the end of which extends into the bore 66 of the sleeve bearing 62 with little play. At a small distance from the sleeve bearing 62, the pivot 68 has a collar 69 of diameter greater than that of the sleeve bearing 62. Each pivot 68 is provided with one slot 70 which with the exception of the web 71 extends over the entire diameter of the pivot 68. The web has a rounded-off support surface 72 which is provided at a desired distance from the front surface of the holding piece 67. The space, thus formed, is filled by a wedge 73 which is movably arranged in the slot 70.

A folding projection 74 is secured to the pivot 68, one end of a strap 75 being soldered to said projection. Said strap 75 is guided around the rounded-off support surface 72 and is there clamped with the wedge 73. The strap 75 extends from the support surface 72 through the slot 70 of the pivot 68 and through the bore 66 of the sleeve bearing 62 to the free end 65 of the bent arm 64 to which it is soldered at the point 76. In order to avoid damage to the strap 75, a rounded-off return place 77 is provided at the end 65 of the arm 64. The strap 75 is made of metal. Other similar straps may be added if desired. Each strap 75 is fixed with an initial stress to the resilient end 65 of the arm 64. The holders for the two straps 75 are constructed so that the straps are exactly in alinement with one another and form together the rotating axis for the rotating coil 5. A return spring for the rotating coil 5 is not needed since the straps 75 themselves exert according to their width upon rotation a restoring moment onto the rotating coil.

An overstress of the straps 75 from impacts is not possible because the free ends 65 of the arms are resilient and the rotating coil 5 has axially and also radially only a very limited possibility of movement which is determined by the play of the end of the pivot 68 in the bore 66 of the sleeve bearing 62 and the small distance between the collar 69 and the sleeve bearing 62.

Thus, the conical bearings 12 and 13 of FIG. 3 are replaced by the above-discussed strap bearing 121 and 131 in the embodiment of FIG. 13. The straps have, among others, the advantage that they are used at the same time both as a current supply line and current discharge line and as a return spring.

Although particular preferred embodiments of the invention have been disclosed for illustrative purposes, it will be recognized that variations or modifications of such disclosure, which come within the scope of the appended claims, are fully contemplated.

I claim:

1. An automatic light exposure control device for cameras, in particular motion picture cameras, comprising a light sensitive electronic sensing device which is controllable by light penetrating through a precision lens and a measuring diaphragm and an electromagnetic interpreting unit which latter is coupled with a rotatable double diaphragm leaf, the one leaf of which forms together with a stationary diaphragm mask a field lens diaphragm of the camera and the other leaf of which forms together with a further stationary diaphragm mask the measuring diaphragm and which controls the current developed by the electronic sensing device into a position of the field lens diaphragm corresponding to the film sensitivity at the luminosity and at the same time controls the position of the measuring diaphragm whereby the interpreting unit variably closes the field lens diaphragm and the measuring diaphragm against a spring force depending on the incident light, characterized in that the light exposure control device has a housing in which there are provided two oppositely positioned adjustable bearings for the rotating axes of a rotating coil and for a core magnet arranged within the rotating coil and a return iron ring enclosing the rotating coil at a radial distance therefrom, and in which housing there is further provided a light opening at the one end of which the precision lens and at least a part of the measuring diaphragm are secured and to the other end of which the light sensitive electronic sensing device is mounted, that furthermore the diaphragm masks are secured in mountings at the housing, that the double diaphragm leaf is pivotable at a small distance over the diaphragm masks, that the rotating coil is mechanically coupled with the measuring diaphragm and also with the field lens diaphragm and that, finally, the light exposure control device which is combined to a compact unit by the housing can be installed in a camera as a unit and can there be adjusted and secured in position relative to the field lens.

2. A light exposure control device according to claim 1, characterized in that the double diaphragm leaf is mounted to the axis of the rotating coil and is connected rotationally fixed with same.

3. A light exposure control device according to claim 1, characterized in that at least one color filter is secured in the light opening seen in direction of the incident light before the electronic device.

4. A light exposure control device according to claim 3, characterized in that an A-filter and a gray filter are secured in the light opening.

5. A light exposure control device according to claim 1, characterized in that the mounting for the core magnet has a support surface and a recess in which the core magnet positively engages with a projection, and that the core magnet is glued onto the mounting in the housing.

6. A light exposure control device according to claim 1, characterized in that the mounting for the return iron ring is formed by two walls extending concentrically and at a radial distance from one another in circular arcs, which walls are connected at a strap by a connecting bridge and at least one wall of which has on its surface facing the ring at the edge not facing the connecting bridge projections for positively holding the return iron ring.

7. A light exposure control device according to claim 1, characterized in that the mountings for the diaphragm masks are constructed as hook-shaped projections which project over an outer surface of the housing, whereby at least one part of each hook-shaped projection extends at a distance parallel to the outer surface of the housing.

8. A light exposure control device according to claim 1, characterized in that the housing consists of plastic.

9. A light exposure control device according to claim 1, characterized in that the light sensitive electrical device is constructed in an actually known manner as a photoresistance.